United States Patent [19]

Lockhart et al.

[11] Patent Number: 4,724,939

[45] Date of Patent: Feb. 16, 1988

[54] CLOSED LOOP CLUTCH SLIP CONTROL SYSTEM WITH TURBINE ROUGHNESS CONTROL

[75] Inventors: Bruce D. Lockhart, Rochester; Dean E. McCulloch, Washington; Gordon L. Tierney, Washington; Cyrus A. Wehner, Warren, all of Mich.

[73] Assignee: General Motors Corporation, Detroit, Mich.

[21] Appl. No.: 886,426

[22] Filed: Jul. 17, 1986

[51] Int. Cl.⁴ .................. F16D 47/02; F16D 43/284
[52] U.S. Cl. .................... 192/3.3; 192/3.31; 192/103 F
[58] Field of Search ............... 192/0.032, 0.033, 0.075, 192/0.076, 0.096, 3.29, 3.3, 3.31, 103 F, 103 R; 361/242; 364/424.1

[56] References Cited

U.S. PATENT DOCUMENTS

| | | | |
|---|---|---|---|
| 4,457,411 | 7/1984 | Hiramatsu | 192/0.076 |
| 4,466,311 | 8/1984 | Hiramatsu | 74/866 |
| 4,468,988 | 9/1984 | Hiramatsu | 74/868 |

FOREIGN PATENT DOCUMENTS

| | | | |
|---|---|---|---|
| 157831 | 9/1982 | Japan | 192/0.033 |
| 157860 | 9/1982 | Japan | 192/3.31 |
| 163732 | 10/1982 | Japan | 192/3.3 |
| 17061 | 1/1984 | Japan | 192/3.29 |
| 180156 | 10/1984 | Japan | 192/3.29 |
| 2163230 | 2/1986 | United Kingdom | 192/103 F |

Primary Examiner—Rodney H. Bonck
Assistant Examiner—David A. Testardi
Attorney, Agent, or Firm—Mark A. Navarre

[57] ABSTRACT

The net engagement pressure of a torque converter clutch is controlled in response to a commanded slip and a slip error indication, for isolating engine torque perturbations from the vehicle driveline. The transmission of an excessive level of engine speed perturbation is detected and used to develop a correction amount for the measured slip. The correction amount increases the slip error indication and causes the slip to be controlled at a higher level, thereby reducing the amount of transmitted engine torque perturbation.

6 Claims, 13 Drawing Figures

CLOSED LOOP CLUTCH SLIP CONTROL SYSTEM WITH TURBINE ROUGHNESS CONTROL

This invention relates to a system for controlling the slip of a fluid pressure operated torque converter clutch, and more particularly to a technique for adjusting the control in a direction to increase the regulated slip under conditions of relatively high engine torque perturbation Introduced as an efficiency increasing device, the torque converter clutch is a fluid operated friction device engageable to couple the impeller (input) and turbine (output) of a fluidic torque converter. In the usual application, the clutch is either fully released to permit unrestrained slippage between the impeller and the turbine or fully engaged to prevent such slippage entirely. An unfortunate aspect of full converter clutch engagement is that the engine torque perturbations or torsionals normally absorbed by the torque converter are passed directly through the clutch to the remainder of the vehicle drivetrain and may produce annoying pulsations therein if not properly damped. This factor operates to restrict the usage of the torque converter clutch to specified vehicle operating conditions for which the annoying effects are minimized. As a result, the potential efficiency gains afforded by engagement of the torque converter clutch have only been realized over a portion of the range of vehicle operation.

To overcome the disadvantages of a fully engaged torque converter clutch, it has been proposed to operate the clutch in a slipping mode wherein a predetermined amount of slippage between the torque converter impeller and turbine is permitted for regulating the torque capacity of the clutch. In any such system, the objective is to isolate engine torque perturbations in the torque converter while passing steady state engine torque at a slip rate that provides improved torque converter efficiency. Various systems that control the clutch slippage to achieve the above objectives are disclosed in the Annis et al. U.S. Pat. No. 3,730,315 issued May 1, 1973; Cheek U.S. Pat. No. 3,752,280 issued Aug. 14, 1973; Chana U.S. Pat. No. 3,977,502 issued Aug. 31, 1976; and Malloy U.S. Pat. No. 4,181,208 issued Jan. 1, 1980, such patents being assigned to the assignee of the present invention.

In such systems, it is generally desired to schedule the slip command in an open loop manner according to the expected level of engine torque perturbation. When a relatively high level of perturbation is expected, the reference slip is maintained relatively high to isolate the perturbations from the driveline. When a relatively low level of perturbation is expected, the reference slip is correspondingly reduced. However, engine torque perturbations cannot be completely anticipated by an open loop control system and a significant amount of engine torque perturbation may be transmitted through the clutching device.

This invention is directed to an improved closed loop slip control system of the type generally described above, wherein the transmission input speed is monitored to detect the transmission of excessive engine torque perturbation through the torque converter clutching device, and wherein the slip error is immediately increased in response to such detection to permit slippage in excess of the reference level. When the transmission of excessive engine torque perturbation has abated, the increase in slip error is progressively removed.

The transmission of engine torque perturbation is detected through an analysis of speed variations in the turbine or output member of the torque converter. Since turbine speed information is required for the closed loop slip control anyway, the roughness detection is obtained without the use of an additional sensor.

Briefly, the roughness sensing technique involves the establishment of a speed variation threshold, below which the level of roughness is acceptable, and above which the level of roughness is excessive. The threshold is adjusted in relation to a long term average of measured speed variation to adaptively calibrate the threshold for the driving schedule and characteristics of an individual vehicle. When the measured speed variation exceeds the threshold, a slip correction determined in proportion to the amount of excessive roughness is applied to the slip error indication to permit clutch slippage in excess of the reference slip. This reduces the level of engine torque perturbation transmitted through the clutch. When the roughness has abated, the slip error correction is reduced in an integral manner.

IN THE DRAWINGS

Figures 3A, 3B:
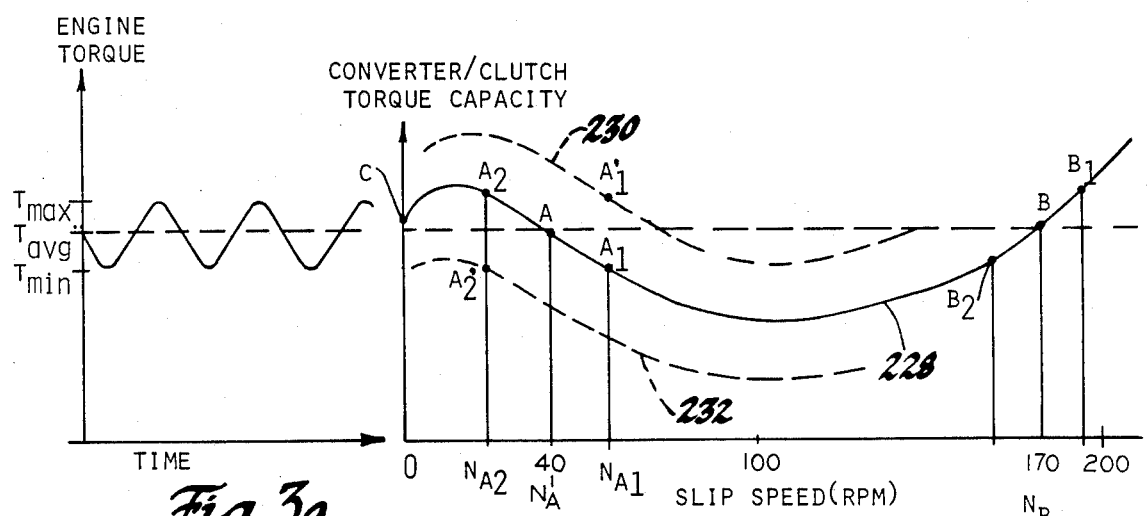
Figure 4:
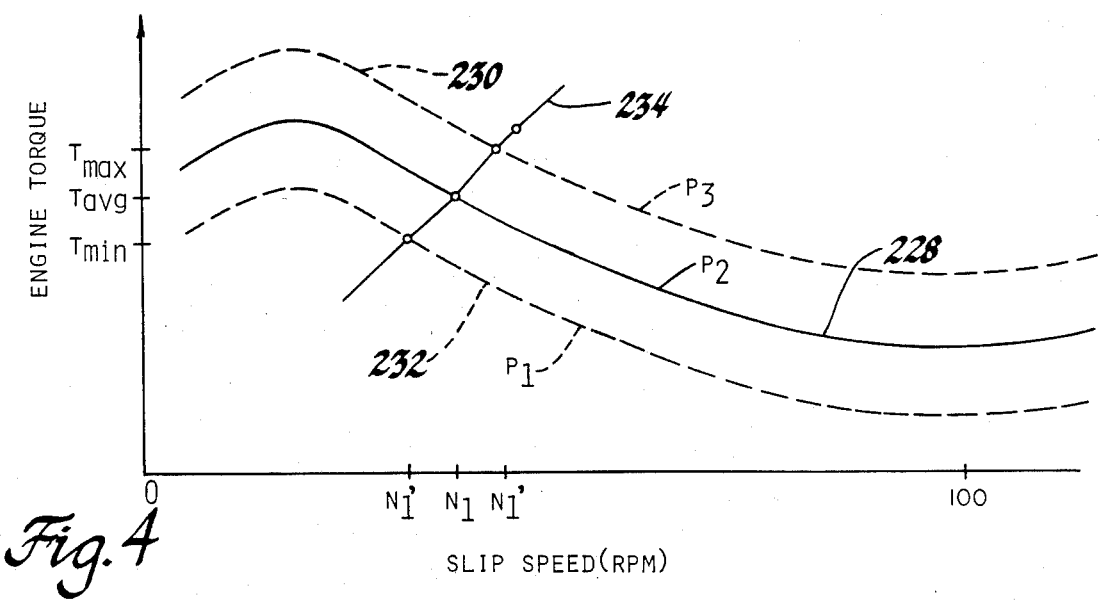

FIGS. 3a, 3b, and 4 are graphs depicting cyclic engine torque perturbation and the effect of such cyclic variations on converter slip.

Figure 5:
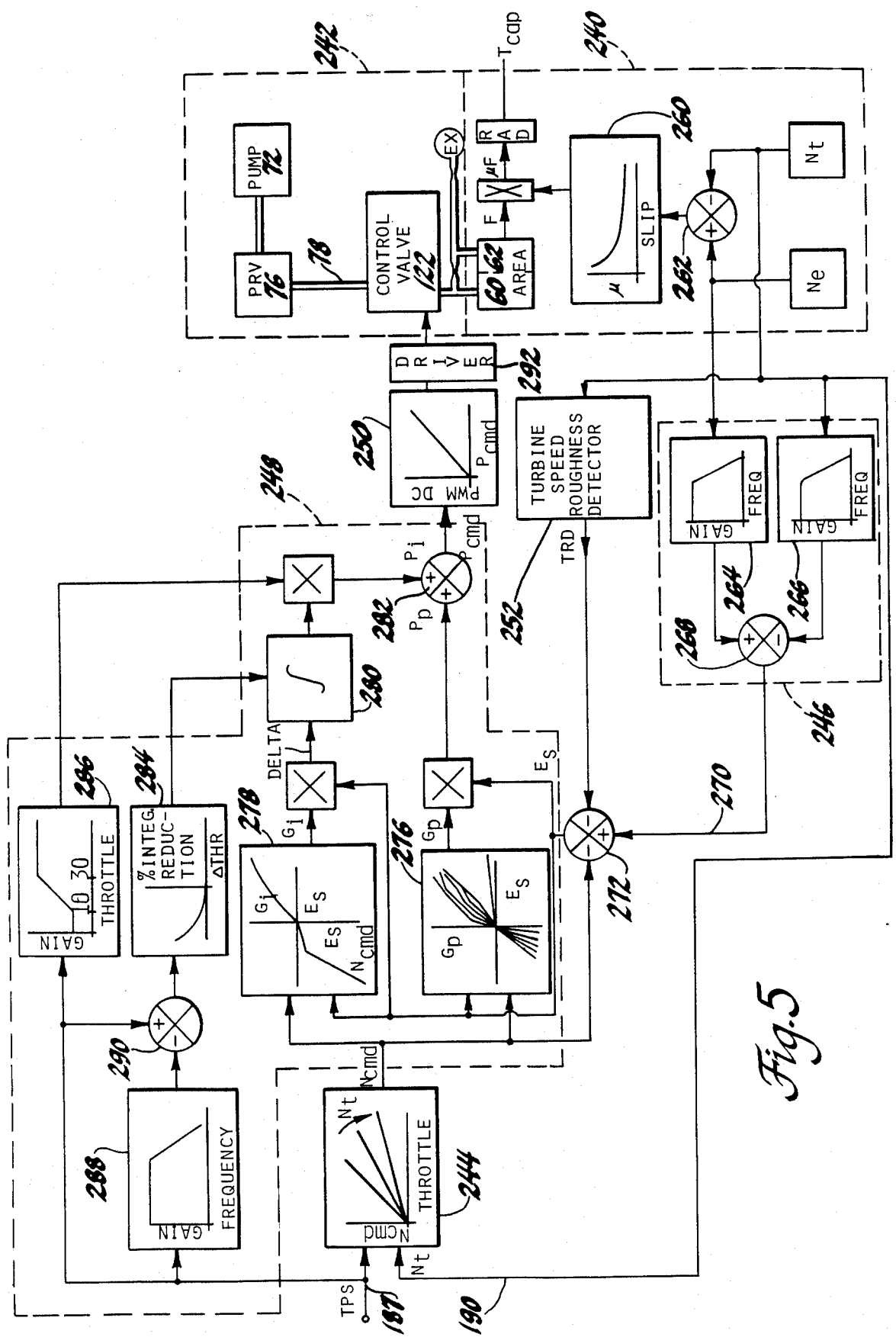

FIG. 5 is a control system block diagram illustrating the closed loop slip control system of this invention.

Figure 6:
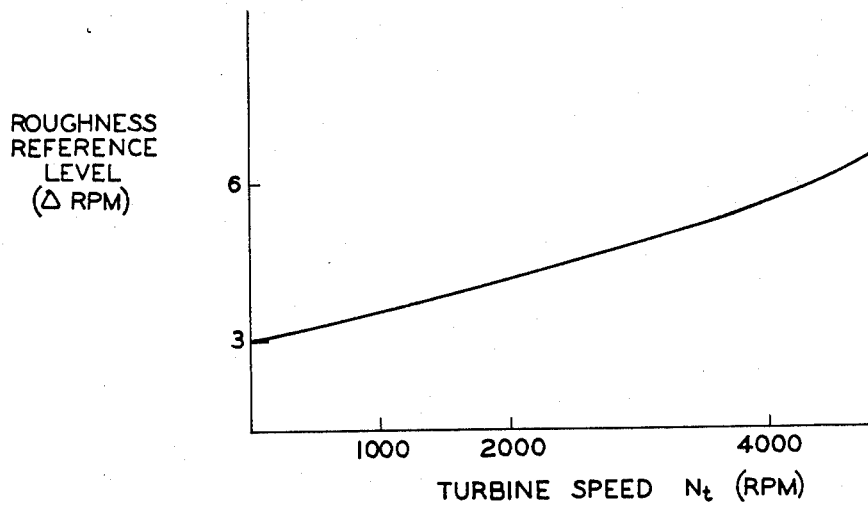
Figure 7:
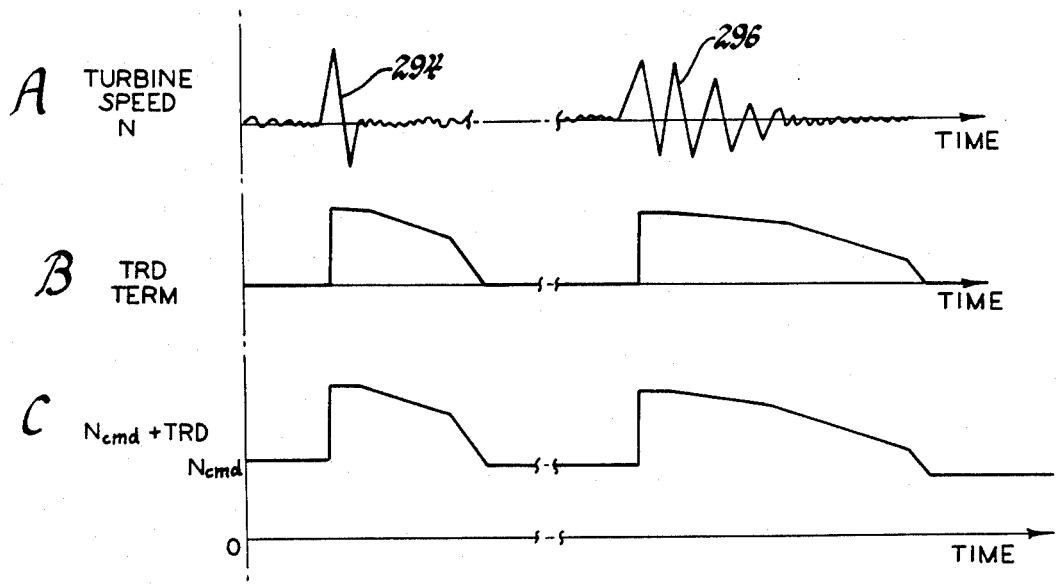

FIGS. 6–7 graphically depict the operation of the system in response to detection of turbine speed roughness.

Figure 1:
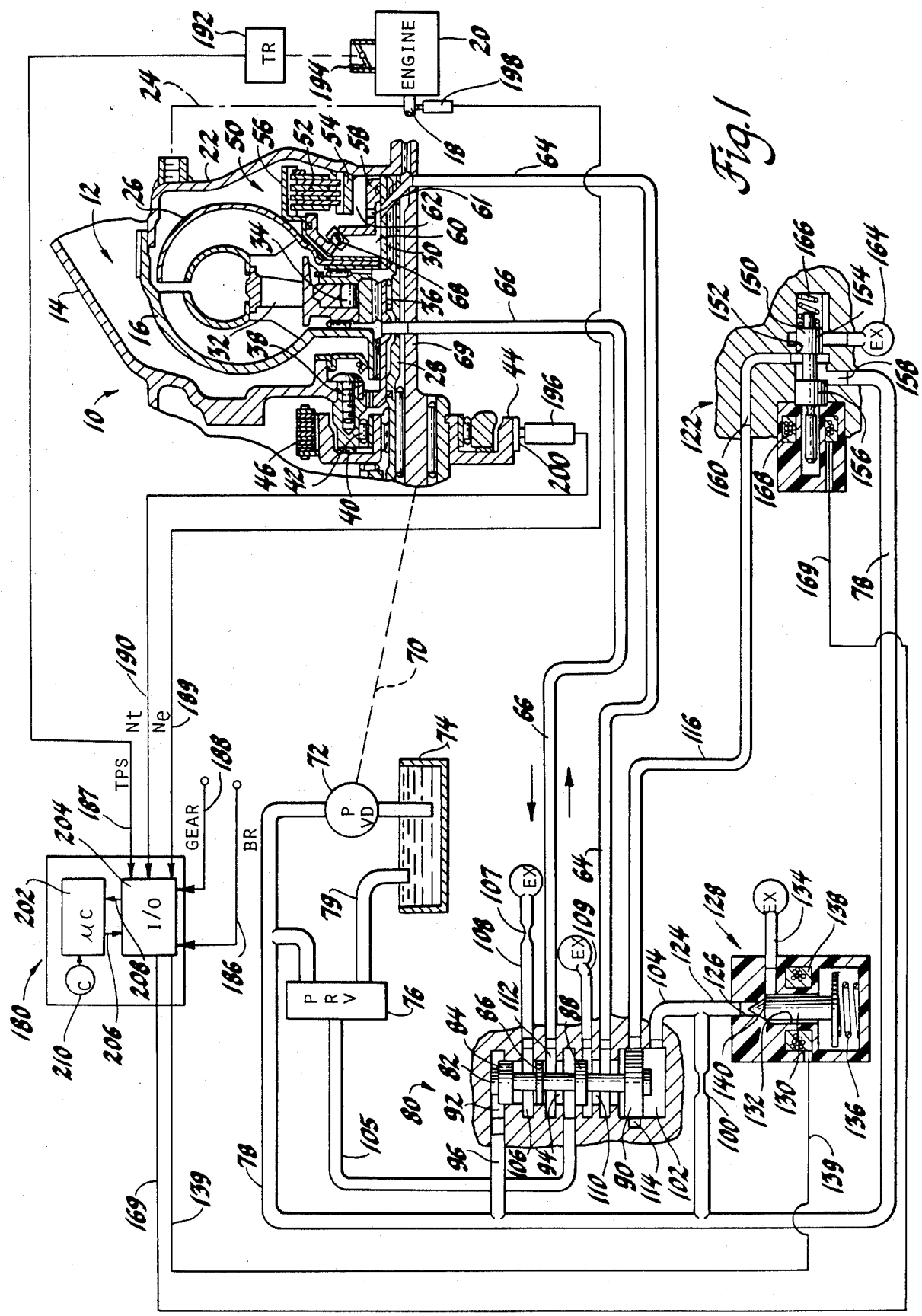
FIG. 1 is a schematic and cross-sectional diagram depicting the torque converter clutch, certain transmission fluid handling elements, and a microcomputer-based control unit for carrying out the control functions of this invention.

FIGS. 8–12 are flow diagrams representative of program instructions executed by the control unit of FIG. 1 for carrying out the control functions of this invention.

Referring now to the drawings, and more particularly to FIG. 1, reference numeral 10 generally designates a portion of an automatic transmission including a conventional fluidic torque converter 12 disposed within the transmission housing 14. The impeller 16 of torque converter 12 is connected to be rotatably driven by the output shaft 18 of engine 20 through the input shell 22, as indicated by the broken line 24. The turbine or output member 26 of the torque converter 12 is rotatably driven by the impeller 16 by means of fluid transfer therebetween, and is connected to rotatably drive the torque converter output shaft 28 through a splined hub member 30. The stator 32 redirects the fluid between the impeller 16 and the turbine 26 and is connected through a one-way device 34 and a splined sleeve shaft 36 to the transmission housing 14 by fasteners 38.

Also, disposed within the housing 14 and preferably integral with sleeve shaft 36 is a bearing support member 40 in which is disposed a needle bearing 42 for rotatably supporting a drive sprocket 44. The converter output shaft 28 is splined in the drive sprocket 44, and a chain 46 drivingly connects the drive sprocket 44 to a complementary drive sprocket (not shown) for providing a plurality of distinct speed ratios between the converter output shaft 28 and the transmission output shaft (not shown). A suitable gear set and the controls therefor are described in detail in the Koivunen et al. U.S. Pat. No. 4,223,569 issued Sept. 23, 1980, and assigned to the assignee of the present invention.

Also disposed within the transmission housing 14 is a torque converter clutch assembly, generally designated by the reference numeral 50. The clutch assembly 50 comprises a plurality of interleaved clutch plates 52 alternately connected to an impeller driven support member 54 or a turbine driven support member 56. A piston axially slidable in the area between the turbine 26 and the clutch plates 52 defines an apply chamber 60 and a release chamber 62.

Fluid is supplied to or exhausted from the clutch apply chamber 60 via the fluid line 64; fluid is supplied to or exhausted from the clutch release chamber 62 via the fluid line 66 and the converter 12. A check ball mechanism 68 permits a one-way flow of fluid from the release chamber 62 to the apply chamber 60. When the fluid pressure in the apply chamber 60 exceeds that in the release chamber 62, there is a resultant force which tends to move the piston 58 rightward as viewed in FIG. 1, into engagement with interleaved clutch plates 52. Such force tends to reduce the slippage between the impeller 16 and turbine 26 and when sufficiently great, fully engages the clutch 50 to prevent such slippage entirely.

When the fluid pressure in release chamber 62 exceeds that in apply chamber 60, there is a resultant force which tends to move the piston out of engagement with clutch plates 52. Such force tends to permit increased slippage between impeller 16 and turbine 26, and when sufficiently great fully releases the clutch 50 to permit unrestrained slippage therebetween. In the released condition, the check ball 68 unseats and permits relatively high fluid flow through the converter for cooling purposes.

The control system of this invention operates as described below to control the fluid pressure in the apply and release chambers 60 and 62 for controlling the amount of slippage between the impeller 16 and the turbine 26. The remainder of the elements depicted in FIG. 1 are devoted at least in part to such purpose.

The input shell 22 has splined thereto a pump drive shaft 69 which extends coaxial with and through converter output shaft 28 and drive sprocket 44 and which is mechanically connected as indicated by the broken line 70 to drive a positive displacement hydraulic pump (P) 72. The pump 72 supplies hydraulic fluid from fluid reservoir 74 to the torque converter 12, the torque converter clutch control valves, the transmission control valves, the various clutches and brakes of the transmission gear set, and the transmission lubrication and cooling systems. The pump 72 is preferably of a variable displacement design, such as that shown in the Schuster U.S. Pat. No. 4,342,545 issued Aug. 3, 1982, and assigned to the assignee of the present invention; however, a fixed displacement pump will perform satisfactorily.

A pressure regulator valve (PRV) 76 is connected to the output of pump 72 and serves to regulate the fluid pressure (hereinafter referred to as line pressure) in line 78 by controlling the pump displacement and/or by returning a controlled portion of the pump output fluid to fluid reservoir 74 via line 79. A second somewhat lower regulated pressure (referred to herein as converter feed pressure) is provided at the pressure regulator output line 105. A pressure regulator valve meeting the above description is described in detail in the above-referenced Schuster U.S. Pat. No. 4,342,545.

Reference numeral 80 generally designates a spool valve selectively actuable to enable or disable engagement of the torque converter clutch 50. The valve 80 comprises a spool 82 having four lands 84, 86, 88 and 90 formed thereon. The lands 84, 86 and 88 are of equal area, and the land 90 is of significantly larger area as shown. Line pressure is supplied directly to the valve chamber 92 via the lines 78 and 96 and through a restriction 100 to the valve chamber 102 via lines 78 and 104. Converter feed pressure is supplied to the chamber 94 via the line 105. The valve chamber 106 is exhausted to the fluid reservoir 74 through the restriction 107 and the exhaust line 108. The valve chamber 110 is connected to the apply chamber 60 via fluid line 64, and the valve chamber 112 is connected to the converter 50 and release chamber 62 via fluid line 66.

The valve chamber 114 is connected via line 116 to a solenoid operated torque capacity control valve generally designated by the reference numeral 122. The valve chamber 102 is connected via line 124 to the input port 126 of a solenoid operated pintle valve generally designated by the reference numeral 128. As explained below, the pintle valve 128 functions to enable or disable engagement of clutch 50, and the torque capacity control valve functions to regulate the net clutch engagement pressure during operation of the clutch 50.

The pintle valve 128 comprises a pintle 130 axially movable within the valve bore 132 to selectively connect its input port 126 to exhaust line 134 which in turn, directs fluid back to the fluid reservoir 74. A spring 136 resiliently biases the pintle 130 upward into engagement with the valve seat 140 as viewed in FIG. 1 to isolate the input port 126 from the exhaust line 134, and a solenoid coil 138 is electrically energizable via conductor 139 to overcome the resilient force of spring 136 and move the pintle 130 downward to connect the input port 126 with the exhaust line 134.

In FIG. 1, the solenoid coil 138 is depicted in the deenergized condition wherein the pintle 130 engages the valve seat 140 to isolate input port 126 from exhaust line 134. As such, fluid pressure is applied to the valve chamber 102 of valve 80 via the restriction 100, and the spool 82 thereof is directed upward as shown. In such position, converter feed pressure is supplied from line 105 to the release chamber 62 via line 66, and the apply chamber 60 is exhausted to an oil cooler (not shown) via line 64 and exhaust line 109. Fluid from the release chamber 62 enters the apply chamber 60 through the check ball mechanism 68 and is returned to the fluid reservoir 74 via the oil cooler.

When the solenoid coil 138 is energized, pintle 130 moves downward and the fluid pressure in the valve chamber 102 is exhausted to the fluid reservoir 74 through exhaust line 134. In such case, the line pressure in valve chamber 92 urges the spool 82 downward. In such position, the release chamber 62 is exhausted through the restriction 107 and line pressure is directed to the apply chamber 60 via the torque capacity control valve 122 and lines 64 and 116. As explained below, the torque capacity control valve 122 is operated to regulate the pressure in apply chamber 62 to control the net engagement pressure of clutch 50.

The torque capacity control valve 122 is a linear solenoid valve comprising a spool 150 axially movable within the valve bore 152 and a pair of unequal area lands 154 and 156 formed thereon. The line pressure conduit 78 is connected to the input port 158 of valve 122, and the line 116 from spool valve 80 is connected to the output port 160. The position of valve spool 150 is controlled by balancing the differential area force with electromagnetic force so as to regulate the pressure in line 116. A spring 166 urges the spool 150 to the left as shown in FIG. 1, and a solenoid coil 168 is energizable via conductor 169 to move the valve spool 150 to the right against the force of spring 166.

In practice, the voltage applied to coil 168 is pulse-width-modulated to control the energization current, and the average current level determines the electromagnetic force to regulate the lineal position of spool 150 within the valve 122. Relative rightward movement of the spool 150 decreases the engagement pressure; relative leftward movement of the spool 150 increases the pressure.

The energization of solenoid coils 138 and 168 is controlled by an electronic control unit via lines 139 and 169, respectively. The control is made in response to a number of input signals including a brake signal (BR) on line 186, an engine throttle signal (TPS) on line 187, a transmission gear signal (GEAR) on line 188, an engine speed signal ($N_e$) on line 189, and a turbine speed signal ($N_t$) on line 190. The brake signal may be obtained with a switch mechanism (not shown) responsive to movement of the vehicle brake pedal such that depression of the brake pedal causes a change in the output state of the brake signal. The engine throttle signal may be obtained with a suitable transducer 192, such as a rotary potentiometer (not shown) responsive to the position of the accelerator pedal or engine throttle 194 for producing an electrical output signal in accordance therewith. The transmission gear signal may be obtained with suitable pressure transducers (not shown) located with respect to the fluid conducting passages of the transmission 10 in a manner to determine which gear ratio is engaged. The turbine speed and engine speed signals are obtained from speed transducers 196 and 198, respectively.

The speed transducers 196 and 198 may be of the variable reluctance type which cooperate with magnetic gear teeth formed on the surface of a rotating shaft. Thus, the speed transducer 196 cooperates with the gear teeth 200 of the drive sprocket 44, and the speed transducer 198 cooperates with the gear teeth of the engine flywheel or other like rotating member. Alternatively, engine spark firing pulses may be used.

As indicated in FIG. 1, the electronic control unit 180 essentially comprises a microcomputer (uC) 202 and an input/output (I/O) device 204, which communicates with microcomputer 202 via an address and control bus 206 and a bi-directional data bus 208. A high frequency clock 210 supplies microcomputer 202 with a high frequency pulse train for controlling the operational timing of the same. The brake, throttle, gear, engine speed and turbine speed signals on lines 186, 187, 188, 189 and 190 are applied as inputs to input/output device 204, and input/output device 204 includes circuitry for converting analog input signals to a digital format and for developing suitable control signals on lines 139 and 169 for controlling the energization of solenoid coils 138 and 168 in response to duty cycle commands developed by microcomputer 202. A flow diagram representative of suitable program instructions executed by microcomputer 202 in the performance of the control functions of this invention is given in FIGS. 8-12.

Figure 2:
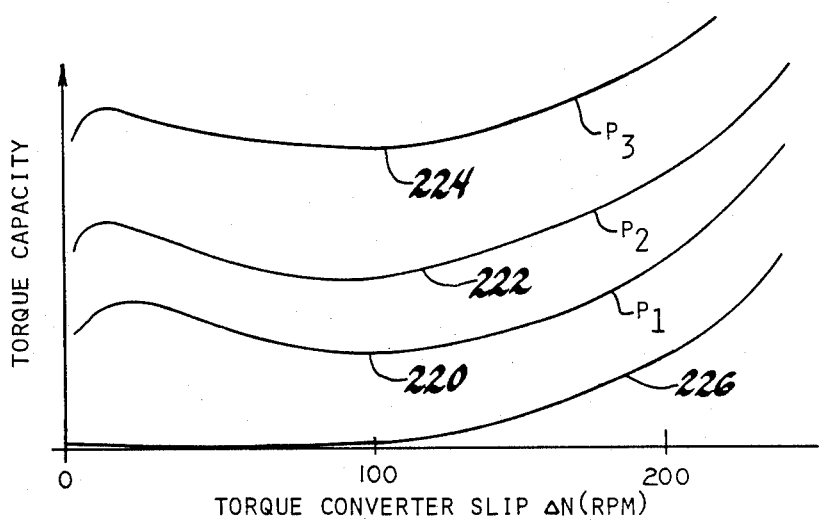
FIG. 2 is a graph depicting the torque capacity of the torque converter and clutch as a function of the torque converter slip N for various levels of clutch engagement pressure $P_1$–$P_3$.

FIG. 2 depicts the combined torque capacity of the torque converter and clutch assembly of FIG. 1 as a function of the torque converter slip $|N_e-N_t|$ for various levels of net clutch engagement pressure. The traces 220-224 depict the combined torque capacity for increasing levels of net engagement pressure $P_1-P_3$. Trace 226 depicts the combined torque capacity when the clutch assembly 50 is fully released, and therefore represents the torque component of the torque converter 12.

At relatively high slip speeds (greater than about 100 RPM in FIG. 2), the torque converter 12 supplies a significant torque capacity component, and the torque capacity vs. slip speed relationship has a positive slope. That is, the torque capacity at a given net engagement pressure increases with increasing slip speed, and decreases with decreasing slip speed. This relationship describes the operating characteristics of a typical torque converter.

At relatively low slip speeds (less than about 100 RPM in the illustrated embodiment), the clutch 50 supplies the dominant torque capacity component, and the torque capacity vs. slip speed relationship may have a negative slope. That is, the torque capacity at a given net engagement pressure increases with decreasing slip. This relationship describes the operating characteristics of typical friction clutch assemblies.

The significance of the clutch and torque converter operating characteristics described above is graphically illustrated in FIGS. 3a-3b. The graph of FIG. 3a depicts engine torque as a function of time. The steady state engine torque is designated $T_{avg}$ and the minimum and maximum torque excursions are designated $T_{min}$ and $T_{max}$, respectively. The trace 228 in FIG. 3b depicts the combined torque capacity of the torque converter 12 and clutch assembly 50 as a function of slip speed for a given net engagement pressure, as in FIG. 2. The same scale is used in the abscissa of each graph.

FIGS. 3a-3b illustrate that the steady state engine torque $T_{avg}$ may be matched by the torque converter 12 and clutch 50 at three different operating points: A, B, and C. At operating point A, the average slip speed $N_A$ is about 40 RPM; the clutch 50 is capable of isolating engine torque perturbations while providing a significant gain in the drivetrain efficiency. At operating point B, the average slip speed $N_B$ is about 170 RPM; the clutch 50 isolates engine torque perturbations, but provides only a marginal gain in drivetrain efficiency. At point C, the clutch 50 is fully engaged, and transmits all engine torque perturbations. Obviously, it would be most advantageous from an efficiency standpoint to control the clutch to operating point A.

Notwithstanding the above, stability concerns indicate that it would be more advantageous to control the clutch to operating point B, where the torque capacity vs. slip speed relationship has a positive slope. At operating point B, increases in slip speed caused by positive input torque disturbances, such as the positive engine torque excursions depicted in FIG. 3a, result in an increase in the combined torque capacity of clutch 50 and torque converter 12. This excursion is designated by the point $B_1$, and is considered to be a stable operating condition because the torque capacity of the converter/clutch matches that of the engine torque excursion ($T_{max}$), and tends to reduce the slip speed back to $N_B$ when the input torque decreases toward the steady state level $T_{avg}$.

Similarly, decreases in slip speed caused by negative input torque disturbances such as the negative engine torque excursions depicted in FIG. 3a result in a decrease in the combined torque capacity of clutch 50 and torque converter 12. This excursion is designated by the point $B_2$, and is also considered to be a stable operating condition because the torque capacity of the converter/clutch matches that of the engine ($T_{min}$) and permits the slip speed to return toward $N_B$ when the engine torque increases toward the steady state level $T_{avg}$.

A similar analysis respecting the operating point A reveals it to be an inherently unstable control point. Increases in slip speed caused by positive input torque disturbances such as the positive engine torque excursions depicted in FIG. 3a result in a decrease in the torque capacity of the converter/clutch. This excursion is designated by the point $A_1$, and corresponds to a slip speed of $N_{A1}$. It is an unstable operating condition because the decreased torque capacity of the clutch 50 permits a further increase in the slip speed. At slip speed $N_{A1}$, a torque capacity of $T_{max}$ is required to match the engine torque, and the converter/clutch can only generate that much torque capacity (designated by $A_1'$) if the net engagement pressure is increased to provide the capacity vs. slip relationship depicted by the broken trace 230. If no torque capacity adjustment is made, the system will quickly shift to the stable operating point B.

Decreases in slip speed caused by negative input torque disturbances such as the negative engine torque excursions depicted in FIG. 3a result in an increase in the torque capacity of the converter/clutch. This excursion is designated by the point $A_2$, and corresponds to a slip speed of $N_{A2}$. It is also an unstable operating condition because the increased torque capacity causes a further reduction in slip speed. At point $A_2$, a torque capacity of $T_{min}$ is required to match the engine torque, and the torque capacity of converter/clutch can only be reduced to that value (designated by $A_2'$) if the net engagement pressure is decreased to provide the capacity vs. slip relationship depicted by the broken trace 232. If no torque capacity adjustment is made, the slip speed will go to zero, as indicated by point C, fully engaging converter clutch 50.

The converter/clutch operating characteristics described above result in a control dilemma. Efficiency dictates that the slip be controlled in the negative slope region at less than about 100 RPM, and stability dictates that the slip be controlled in the positive slope region at greater than about 100 RPM.

A related and co-pending application U.S. Ser. No. 886,421, filed July 17, 1986, assigned to the assignee of the present invention, is related to a proportional and integral gain scheduling and feed forward compensation technique (as described herein) for effecting clutch engagement pressure adjustments as a function of the commanded slip and the slip error. Such scheduling technique effectively copes with the negative slope clutch characteristic described above, at least when changes in the level of engine torque perturbation are timely anticipated.

The roughness detection and correction technique of this invention detects excessive turbine speed perturbation (and therefore, the transmission of an excessive level of engine torque perturbation), and operates to increase the clutch slippage by effectively increasing the slip speed command. While the roughness detection and correction technique of this invention is depicted herein in connection with the gain scheduling technique claimed in the above U.S. Ser. No. 886,421 as part of an overall control system, it should be understood that the technique of this invention could also be advantageously used in connection with a more conventional closed loop slip control system.

FIG. 5 shows a system diagram of a torque converter clutch 50 as set forth in FIG. 1 and a closed loop slip control system therefor according to this invention. The elements are depicted in the slip control mode. The clutch 50 and fluid handling elements are schematically depicted in the area designated by the reference numeral 240. The control system includes a slip command generator 244; feedback elements 246 for generating an indication corresponding to the actual slip; gain scheduling and feed forward elements 248 for generating a clutch pressure command; an output function generator 250; and a turbine speed roughness detector 252.

As set forth in FIG. 1, the fluid pressure handling elements include a pump 72, a pressure regulator valve 76 for generating regulated converter feed pressure in line 105, and a linear fluid control valve 122 for controlling the pressure in line 64. The clutch plates 52 are represented as an area across which the apply and release chamber pressures act. The line 64 is connected to the apply chamber 60, the orifice 61 feeds the release chamber 62, and the release chamber 62 is exhausted through the orifice 107 when the solenoid coil 138 of valve 128 is energized for clutch engagement. The torque capacity $T_{cap}$ of the clutch 50 is determined according to the product of the force F acting across the clutch plate area, the coefficient of friction u, and the clutch plate radius RAD. The coefficient of friction u of the clutch plates 52, in turn, is determined as a function of the slip ($N_e-N_t$) thereacross as indicated by the summing junction 262 and the characteristics block 260.

The slip command generator 244 generates a slip speed command $N_{cmd}$ in response to engine throttle position TPS (line 187), and turbine speed $N_t$ (line 190). Throttle position is indicated along the ordinate axis, and the various traces correspond to different values of turbine speed $N_t$. In general, the slip command $N_{cmd}$ increases with increasing throttle position, and decreases with increasing turbine speed.

The feedback elements 246 include the low pass filters 264 and 266 for passing the steady state values of measured engine speed $N_e$ and turbine speed $N_t$, and the summing junction 268 for differencing the filtered speed values to provide a filtered slip speed indication on line 270. The commanded slip $N_{cmd}$ is applied to the summing junction 272, where it is combined with the output of a turbine roughness detector (TRD) 252 and subtracted from the filtered slip indication (line 270) to form a signal indicative of the slip error $E_s$.

The turbine roughness detector 252 and summing junction 272 are associated with the roughness detection and correction system of this invention, and serve to decrease the slip error indication $E_s$ when excessive turbine speed roughness is detected. A detailed description of this technique is provided below in reference to the graphs of FIGS. 6-7, and the flow diagram of FIG. 10.

The proportional and integral gain scheduling portion of the elements 248 include proportional and integral function generators 276 and 278, an integrator 280, and a summing junction 282 for generating a pressure command $P_{cmd}$ as a function of proportional and integral terms $P_p$ and $P_i$. The function generators 276 and 278 generate proportional and integral gain terms $G_p$ and $G_i$ as a function of the slip command $N_{cmd}$ and the slip error indication $E_s$. The proportional term $P_p$ is determined according to the product of the proportional gain term $G_p$ and the slip error $E_s$. The integral term $P_i$ is determined by integrating the product of the integral gain term $G_i$ and the slip error $E_s$ at block 280.

The feed forward portion of the elements 248 includes the function generators 284 and 286. The function generator 284 serves to reduce the magnitude of the integrator 280 in response to the detection of throttle movement in a negative or closing direction, thereby providing relatively fast reduction of the clutch pressure when a reduction in the engine torque output is anticipated. The faster response provided by the feed forward function generator 284 serves to avoid full engagement of the clutch 50 when the throttle is suddenly released. The input for function generator 284 is provided by subjecting the throttle position signal (TPS) to a low pass filter 288, and differencing the filtered and unfiltered throttle signals at summing junction 290. The function generator 286 serves to increase the integral term $P_i$ as the throttle position is increased from a relatively low setting to a relatively high setting, thereby providing relatively fast increase of the clutch pressure when increased engine output torque is anticipated. The faster response provided by the feed forward function generator 286 serves to limit engine speed flare (slip) when the throttle is suddenly increased and clutch lockup when the throttle is suddenly closed.

The output function generator 250 contains the pressure vs. duty cycle transfer functions of the clutch 50 and torque capacity control valve 122. It serves to output an energization duty cycle (DC) which, when applied to the valve 122, will produce a net clutch engagement pressure that corresponds with the pressure command $P_{cmd}$. The DC output of function generator 250 is applied to a pulse-width-modulation (PWM) driver 292, which suitably energizes the coil 168 of valve 122.

The operation of the roughness detection and correction technique of this invention is graphically depicted in FIGS. 6–7. The input to the turbine roughness detector 252 is an unfiltered measure of turbine speed $N_t$ as indicated by the trace segments 294 and 296. An turbine speed dependent roughness threshold defines a predetermined level of acceptable output perturbation, and defines a window of turbine speed variation for which no correction is made. The relation between turbine speed and the window size is depicted in FIG. 6. The actual turbine speed variation is measured and subjected to a relatively long time constant filter, the output of which is used to adaptively adjust the roughness threshold with the driving schedule of the vehicle. The output of the long time constant filter comes into effect when the vehicle is driven over a rough road surface which produces unusually high turbine speed variation. Such variation is not due to the transmission of engine torque perturbation through the clutch, and the output of the long time constant filter operates so long as the condition persists to increase the roughness threshold, thereby to prevent the roughness detector 252 from reducing the clutch engagement pressure.

The measured turbine speed variation is filtered and compared to the threshold to detect excessive roughness. When excessive roughness is detected, a correction amount is determined in proportion to the magnitude of the variation and subtracted from the slip speed indication $(N_t-N_e)$ to decrease the slip error indication $E_s$. The decreased error indication causes the gain scheduling elements 248 to reduce the clutch engagement pressure, thereby increasing the clutch slippage and reducing the level of transmitted engine torque perturbation. When the turbine speed variation falls below the roughness threshold, the correction amount is decreased on an integral basis as described below in reference to FIG. 9 to progressively return the slip to the commanded value $N_{cmd}$.

Graph B of FIG. 7 is on a common time base with Graph A, and depicts the correction amount generated by the turbine roughness detector 252 in response to the turbine speed trace 294. Graph C is also on a common time base, and depicts the sum of the slip command $N_{cmd}$ and the correction TRD. The turbine speed variation designated by the reference numeral 294 is of short duration, as might be caused by driving the vehicle over a bump in the roadway. In such case, the TRD term is maintained for a correspondingly brief period, and then progressively returned to zero. When driving over a bumpy road surface, a series of such excessive variations are detected, and the TRD term tends to maintain the increased clutch slip until the variation subsides.

The turbine speed variation designated by the reference numeral 296 corresponds to a period of substantial and uninterrupted roughness, as might be experienced at the onset of full clutch engagement. In such case, the TRD term is quickly increased and maintained at a relatively high level to increase the clutch slippage and avoid the instability. When the instability is avoided and the excessive roughness subsides, the TRD term is progressively returned to zero, and the slip command $N_{cmd}$ is controlling.

The progressive reduction of the TRD term following a reduction or subsidence of excessive roughness is carried out with a variable rate filter. A roughness term (designated TR in the flow diagram of FIG. 9) indicates the amount of excessive roughness present in the turbine. When the roughness term decreases in response to the increased slippage, the TRD term is integrated toward the roughness term at a variable rate. The rate starts out slow, and then becomes progressively faster (three steps in the illustrated embodiment) when excessive roughness is no longer indicated. The different rates are graphically illustrated by the various slopes in the traces of Graphs B and C.

Figure 8:
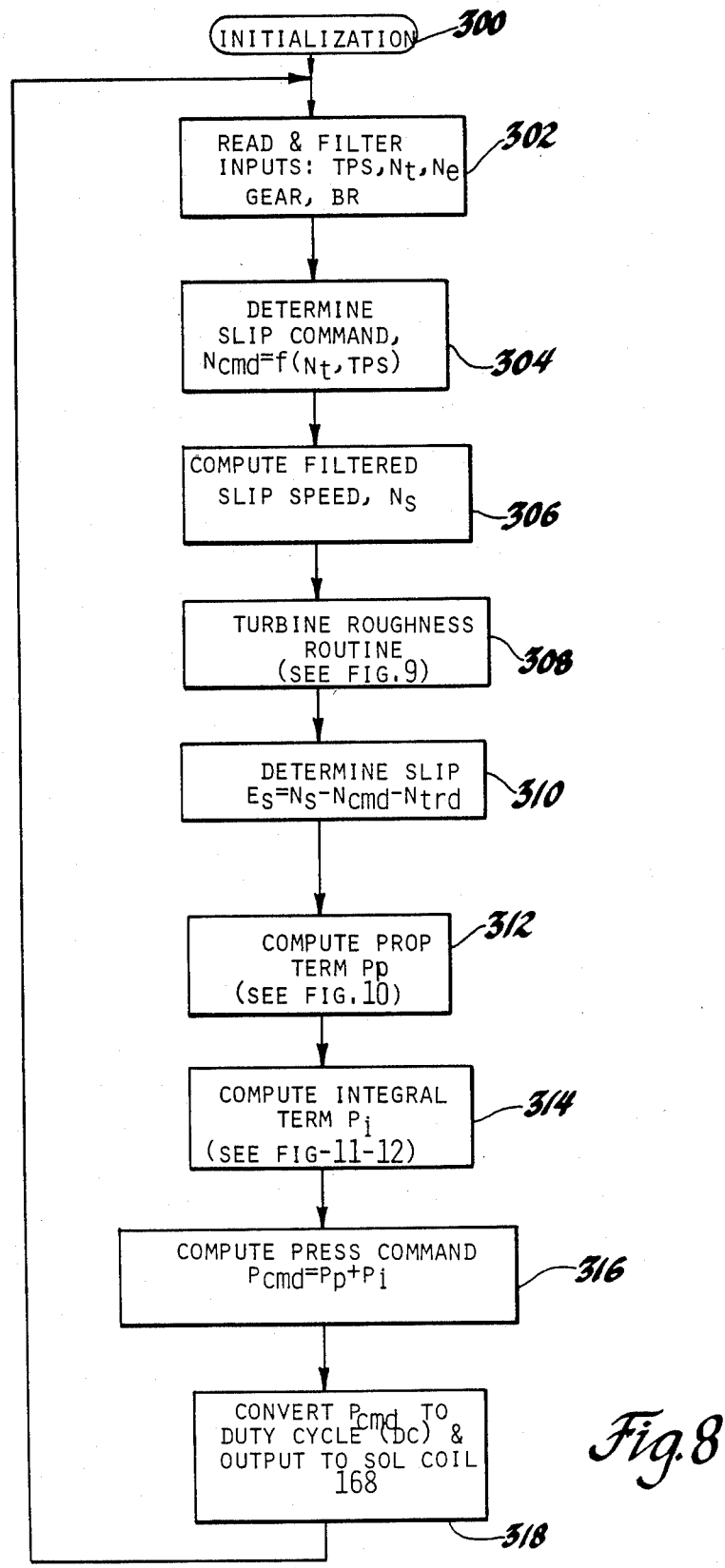

The control functions described above are carried out by the microcomputer 202 of FIG. 1 as it executes a set of computer program instructions stored therein. Such program instructions are functionally described below in reference to the flow diagrams of FIGS. 8–12. FIG. 8 represents a main or executive loop, denoting the major tasks performed by the microcomputer 202. The FIGS. 9–12 set forth certain of such major tasks in greater detail.

Referring now more particularly to FIG. 8, the reference numeral 300 designates a series of instructions executed at the initiation of each period of vehicle operation for initializing various timers, variables and registers within the microcomputer. Once the initialization routine is executed, the operations designated by the instruction blocks 302–318 are periodically executed in sequence as indicated by the flow lines.

First, the various inputs on lines 186–190 are read and filtered if necessary, as indicated by instruction block 302. Instruction block 304 indicates the determination of slip speed command $N_{cmd}$ as a function of the turbine speed $N_t$ and the throttle position TPS. Instruction block 306 indicates the computation of filtered slip speed $N_s$ as a function of the measured turbine and engine speeds $N_t$ and $N_e$. Instruction block 308 indicates the computation of the turbine roughness term TRD, which is detailed in FIG. 9. Instruction block 310 indicates the computation of the slip speed error term $E_s$. Instruction block 312 indicates the computation of the proportional term $P_p$, which is detailed in FIG. 10. Instruction block 314 indicates the computation of the integral term $P_i$, which is detailed along with the feed forward function in FIGS. 11-12. Instruction block 316 indicates the computation of the pressure command $P_{cmd}$ according to the sum of the proportional and integral terms $P_p$ and $P_i$. Finally, as indicated by instruction block 318, the pressure command $P_{cmd}$ is converted to a duty cycle of pulse-width-modulation and outputted to the coil 168 of valve 122.

Figure 9:
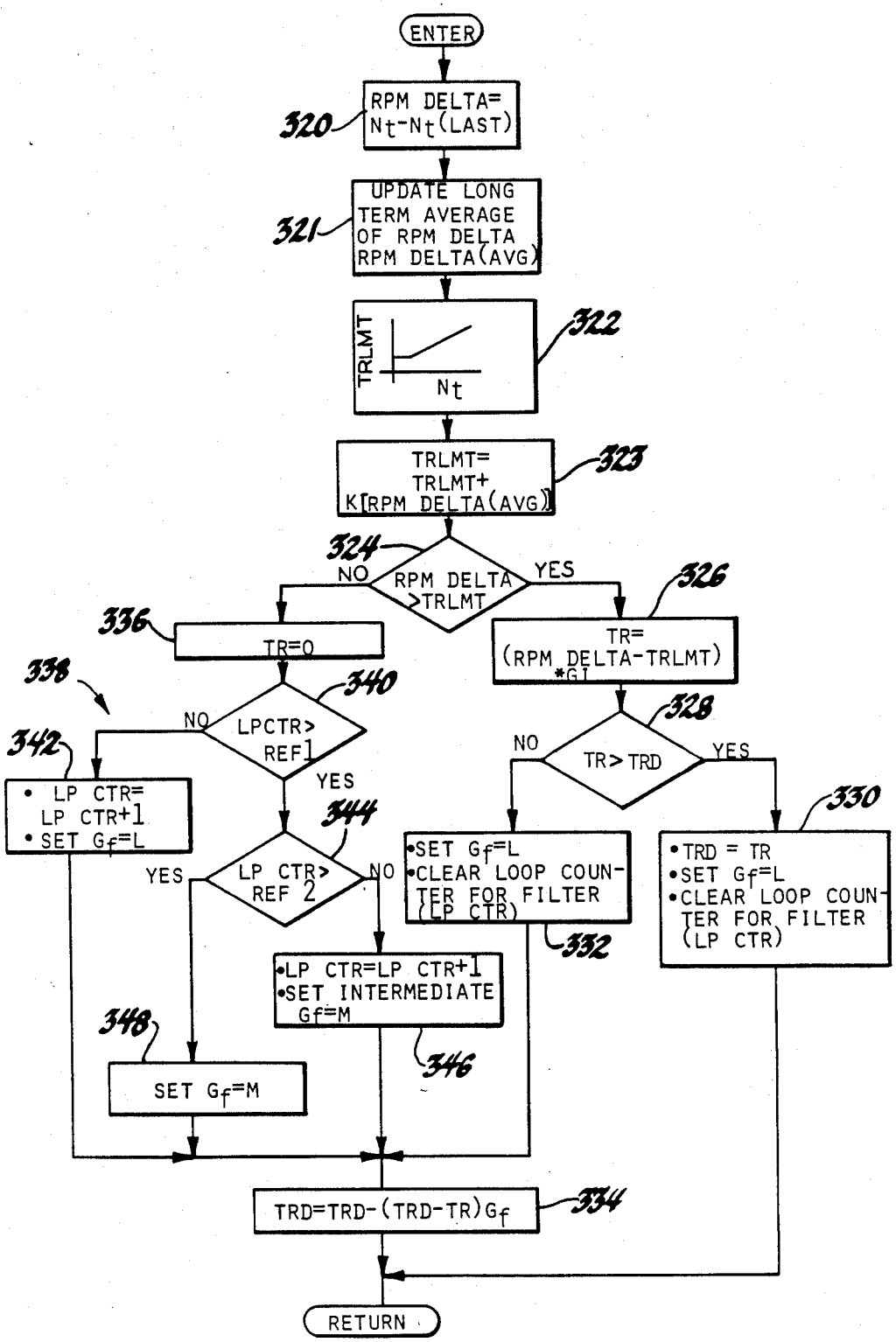

Referring now to the turbine roughness detection routine of FIG. 9, the instruction block 320 is first executed to compute RPM DELTA, the change in turbine speed since the last execution of the routine. The instruction block 321 is then executed to update a long term average, RPM DELTA(AVG) of RPM DELTA. The term RPM DELTA(AVG) may be computed by the expression:

RPM DELTA(AVG)=RPM
DELTA(OLD)−K1[RPM
DELTA(OLD)−RPM DELTA(NEW)]

where K1 is a constant. The instruction blocks 322-323 are then executed to determine a lower limit or threshold of turbine roughness TR LMT as a function of the engine speed $N_t$, and to adjust TR LMT as a function of RPM DELTA(AVA).

If RPM DELTA exceeds TR LMT, as determined at decision block 324, there is excessive turbine roughness. In such case, the instruction block 326 is executed to compute a turbine roughness indication TR according to the expression:

TR=(RPM DELTA−TR LMT)×G1 where G1 is a fixed gain factor. As explained below, reduction of the output TRD of the turbine roughness detection routine is provided by integrating the roughness indication TR at a variable gain $G_f$ according to the expression set forth at instruction block 334. However, whenever the roughness indication TR exceeds TRD (as determined at decision block 328), instruction block 330 is executed to set the output term TRD equal to TR. In addition, the integrator gain $G_f$ is set at a relatively low value L, and the filter loop counter, LP CTR, is reset. If TR is less than the output term TRD, instruction block 332 is executed to set the gain $G_f$ at the relatively low value L, and to reset the loop counter LP CTR. The instruction block 334 is then executed to update the output term TRD in accordance with the expression indicated therein.

If RPM DELTA does not exceed TR LMT, excessive turbine roughness is no longer present, and the instruction block 336 is executed to set the turbine roughness indication TR equal to zero. Then, the blocks designated generally by the reference numeral 338 are executed to set the gain $G_f$ before the instruction block 334 updates the output term TRD as described above. If the loop counter LP CTR is less than or equal to a first reference REF1 (as determined at decision block 340), the instruction block 342 is executed to increment LP CTR, and to set the gain $G_f$ at a relatively low value L before updating the output term TRD. If LP CTR is between REF1 and a second, higher, reference REF2 (as determined by decision blocks 340 and 344), the instruction block 346 is executed to increment LP CTR, and to set the gain $G_f$ at an intermediate value M before updating the output term TRD. If LP CTR exceeds REF2, the instruction block 348 is executed to set the gain $G_f$ at a relatively high rate H before updating the output term TRD.

The variable integrator rate operates, as graphically depicted in FIG. 7, to maintain the TRD term (and hence the increased slippage) relatively high so long as excessive roughness is present. When the excessive roughness subsides, the TRD term is reduced in accordance with a predetermined and relatively fast schedule (L to M to H).

Figure 10:
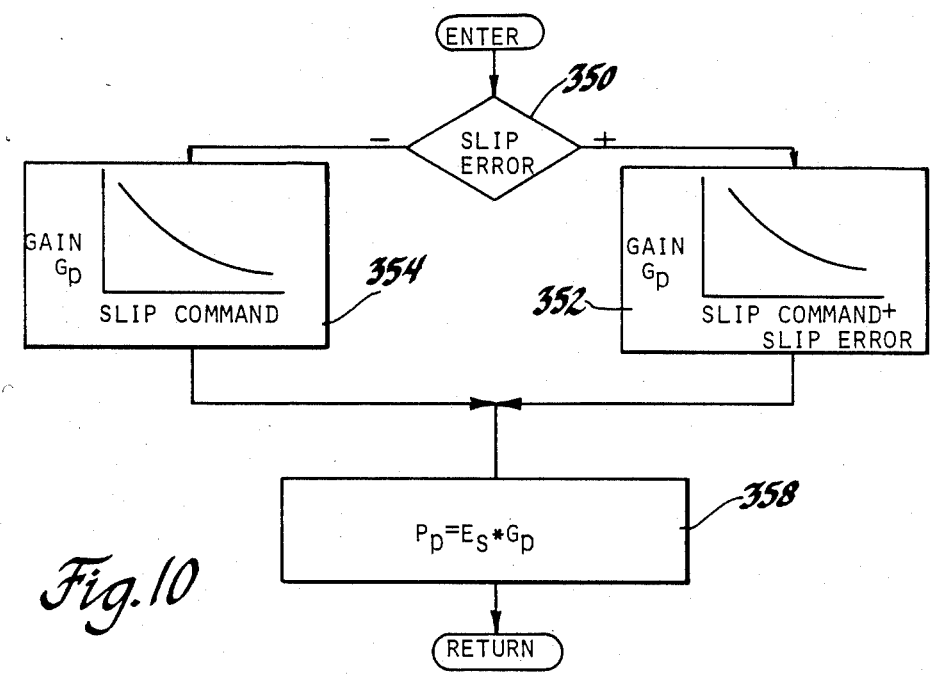

Referring now to the computation of the proportional term $P_p$ as set forth in the flow diagram of FIG. 10, the decision block 350 is executed to determine the slip error polarity. If the slip error is positive, the proportional gain term $G_p$ is determined in accordance with instruction block 352; if the slip error is negative, the proportional gain term $G_p$ is determined in accordance with instruction block 354. In either event, the instruction block 358 is then executed to compute the proportional term $P_p$ according to the product $(E_s)(G_p)$.

Figure 11:
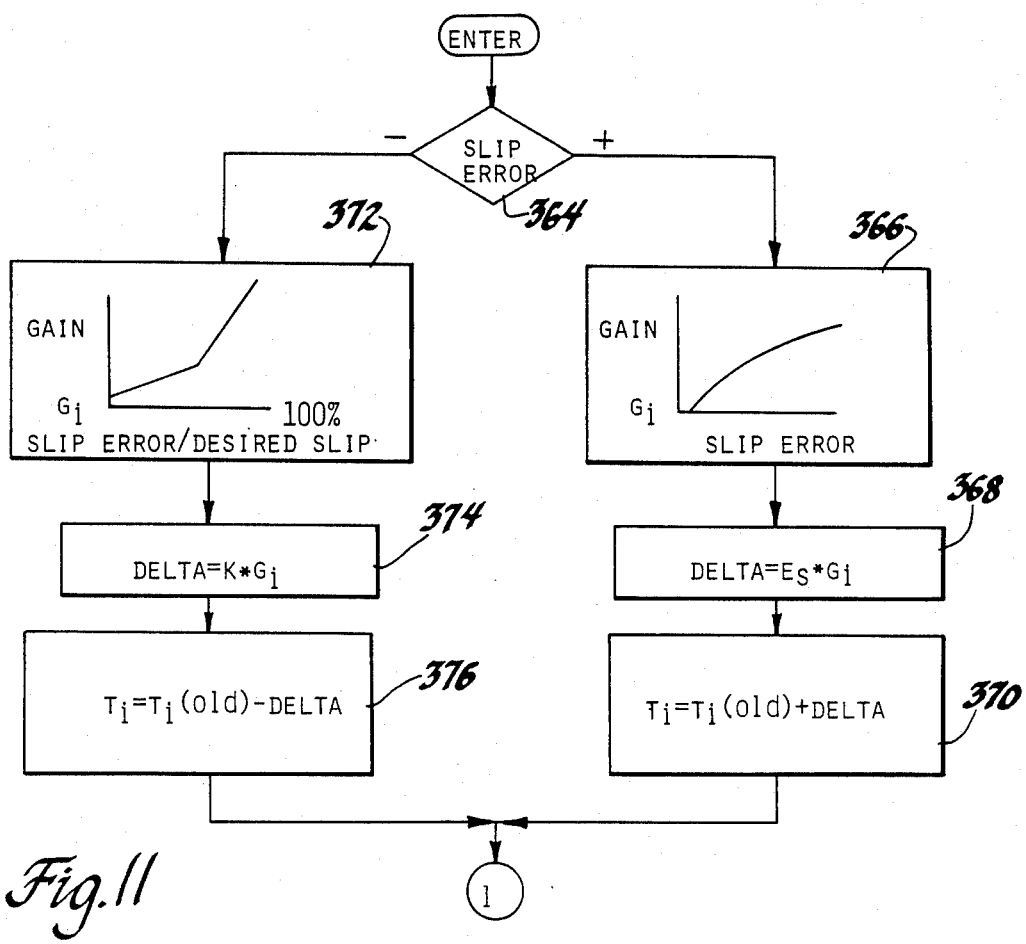
Figure 12:
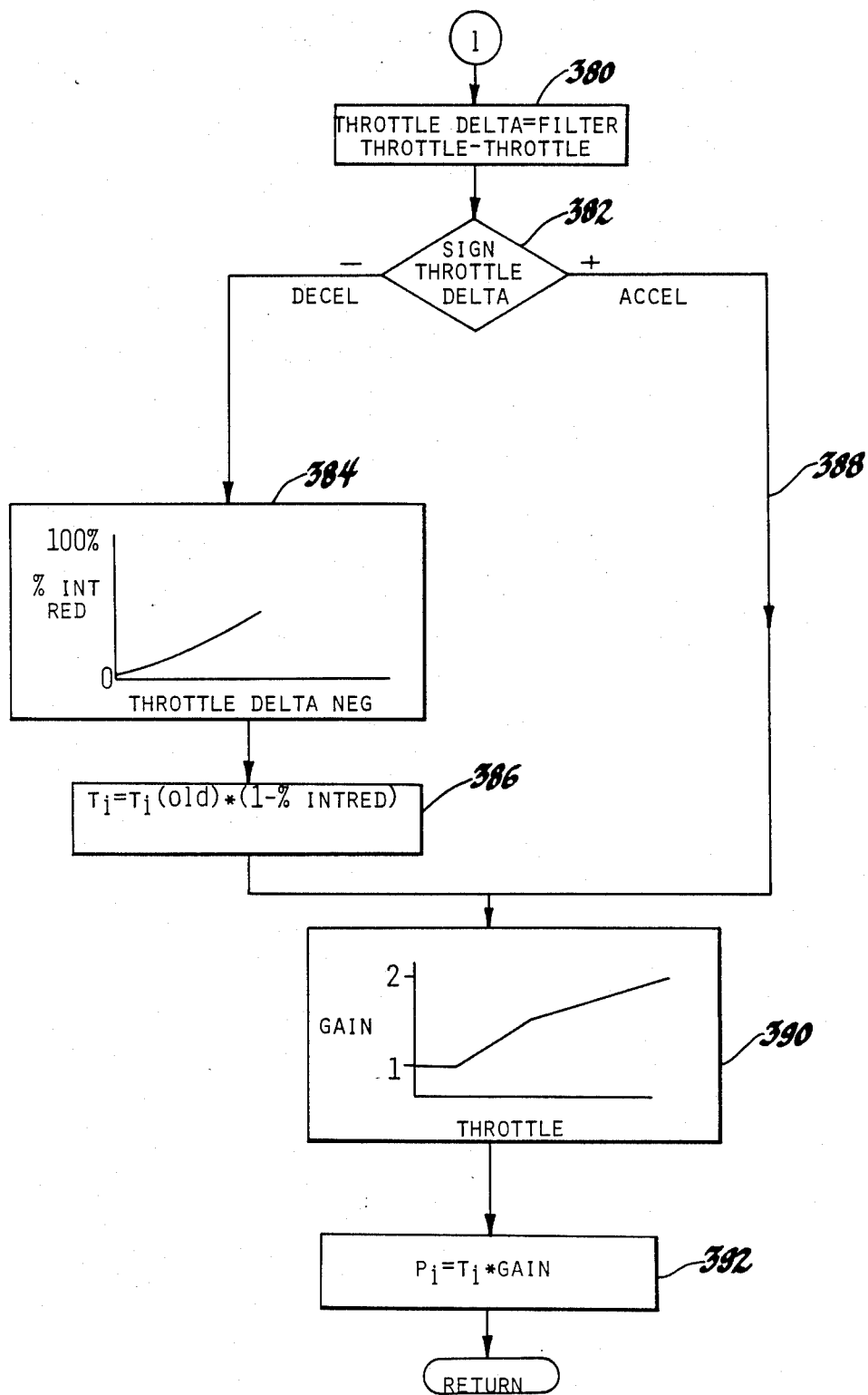

Referring now to the computation of the integral term $P_i$ as set forth in the flow diagram of FIGS. 11-12, the instruction block 364 is executed to determine the slip error polarity. If the slip error is positive, the integral gain term $G_i$ is determined in accordance with instruction block 366 and the instruction blocks 368-370 are executed to compute the integrator DELTA and to update an intermediate integral term $T_i$. If the slip error is negative, the integral gain term $G_i$ is determined in accordance with instruction block 372, and the instruction blocks 374-376 are executed to compute the integrator DELTA and to update the intermediate integral term $T_i$.

Once the intermediate integral term $T_i$ is computed, the flow diagram portion depicted in FIG. 12 is executed to complete the calculations for the integral term $P_i$ in accordance with the feed forward indications. First, the instruction block 380 is executed to compute the change in throttle position TPS DELTA according to the difference between the measured and filtered throttle values. If TPS DELTA is negative (as determined at decision block 382), the instruction blocks 384-386 are executed to determine an integrator reduction factor FACTOR and to apply it to the current value of the intermediate integration term $T_i$. If TPS DELTA is positive, the instruction blocks 384-386 are skipped as indicated by the flow diagram line 388. In either event, the instruction blocks 390-392 are then executed to determine throttle position based gain and to apply such gain to the intermediate integral term $T_i$, thereby solving for the signed integral term $P_i$.

While this invention has been described in reference to the illustrated embodiment, it will be recognized that various modifications thereto will occur to those skilled in the art. Systems or methods of operation incorporating such modifications may fall within the scope of this invention, which is defined by the appended claims.

The embodiments of the invention in which an exclusive property or privilege is claimed are defined as follows:

1. In a motor vehicle including a torque converter adapted to receive engine torque through an input member thereof and to supply torque to the vehicle drivetrain through an output member thereof, a clutch mechanism connected between the input and output members of said torque converter, the clutch mechanism being operative when fully engaged to prevent slip between such input and output members, and when less than fully engaged to permit slip between such input and output members, and a clutch actuating mechanism for controlling the torque capacity of said clutch in relation to the fluid pressure supplied thereto, a method of operating said clutch mechanism so as to avoid the passage of engine torque perturbations therethrough, comprising the steps of:

defining a desired slip signal corresponding to a desired level of clutch slippage for isolating engine torque perturbations from the output member of said clutch, an actual slip signal corresponding to the actual level of clutch slippage, and a slip error signal in accordance with the difference between the actual and desired slip signals;

controlling the fluid pressure supplied to the clutch actuating mechanism so as to drive the slip error signal to zero, and thereby maintain the actual clutch slippage at the desired level;

measuring the speed variation of the torque converter output member;

establishing a predetermined threshold speed variation for the output member in accordance with the output speed, such threshold defining a level of output member speed variation above which the clutch is deemed to be transmitting an excessive amount of engine torque perturbation; and when the measured variation exceeds the threshold speed variation, reducing the slip error signal in relation to the measured speed variation in a direction such that the fluid pressure supplied to the clutch control chamber is decreased to permit clutch slippage to be controlled to a higher level than the desired level.

2. The method set forth in claim 1, including the steps of:

subjecting the measured speed variation of the torque converter output member to a relatively long time constant filter to indicated a condition of turbine roughness not caused by the transmission of engine torque perturbation through said clutch; and increasing the value of said predetermined threshold speed of variation for the output member in accordance with an output of said relatively long time constant filter, whereby the amount of slip error signal reduction is reduced so long as such indicated condition persists.

3. In a motor vehicle including a torque converter adapted to receive engine torque through an input member thereof and to supply torque to the vehicle drivetrain through an output member thereof, a clutch mechanism connected between the input and output members of said torque converter, the clutch mechanism being operative when fully engaged to prevent slip between such input and output members, and when les than fully engaged to permit slip between such input and output members, and a clutch actuating mechanism for controlling the torque capacity of said clutch in relation to the fluid pressure supplied thereto, a method of operating said clutch mechanism so as to avoid the passage of engine torque perturbations therethrough, comprising the steps of:

defining a desired slip signal corresponding to a desired level of clutch slippage for isolating engine torque perturbations from the output member of said clutch, an actual slip signal corresponding to the actual level of clutch slippage, and a slip error signal in accordance with the difference of the actual and desired slip signals;

supplying fluid pressure to the clutch actuating mechanism in accordance with the magnitude and sign of the slip error signal so as to maintain the actual clutch slippage at the desired level;

cyclically determining a sample of the speed of the torque converter output member and generating an output speed variation signal according to the difference between successively determined speed samples;

establishing a predetermined threshold speed variation for the output member in accordance with the engine speed, such threshold defining a level of output member speed variation above which the clutch is deemed to be transmitting an excessive amount of engine torque perturbation;

updating an output roughness signal in proportion to the difference between the output speed variation signal and the threshold speed variation when the output speed variation signal exceeds the threshold speed variation;

determining a slip error correction amount in relation to the output roughness signal; and adjusting the slip error signal by the slip error correction amount such that the slip error signal indicates reduced slippage to thereby effect an adjustment in the fluid pressure supplied to the clutch actuating mechanism which permits clutch slippage in excess of the desired level, whereby the level of engine torque perturbation transmitted through the clutch is reduced.

4. The method set forth in claim 3, wherein the step of determining the slip error correction amount includes the steps of:

setting the slip error correction amount equal to the output roughness signal when the output speed variation signal is at least as great as the threshold speed variation and the output roughness signal is at least as great as current value of the slip error correction amount; and integrating the slip error correction amount toward the output roughness signal when the output speed variation signal is less than the threshold speed variation and the output roughness signal is less than the current value of the slip error correction amount.

5. The method set forth in claim 4, wherein the rate of integration of the slip error correction amount is variable and determined in relation to the relative magnitudes of the output speed variation signal and the threshold speed variation such that the correction amount is maintained relatively high so long as the output speed variation signal exceeds the threshold speed signal, and to progressively reduce the correction amount to zero in accordance with a relatively fast rate schedule when the output speed variation signal falls below the threshold speed variation.

6. The method set forth in claim 4, wherein the step of integrating the slip error correction amount toward the output roughness signal includes the step of:

resetting the output roughness signal to zero when the output speed variation signal falls below the threshold speed variation.

* * * * *